United States Patent
Ueda

(10) Patent No.: US 7,062,969 B2
(45) Date of Patent: Jun. 20, 2006

(54) MEASUREMENT APPARATUS AND SENSOR APPARATUS

(75) Inventor: Takashi Ueda, Izumi (JP)

(73) Assignee: Cateye Co., Ltd., Osaka (JP)

( * ) Notice: Subject to any disclaimer, the term of this patent is extended or adjusted under 35 U.S.C. 154(b) by 0 days.

(21) Appl. No.: 10/921,682

(22) Filed: Aug. 19, 2004

(65) Prior Publication Data
US 2005/0043915 A1 Feb. 24, 2005

(30) Foreign Application Priority Data
Aug. 22, 2003 (JP) .............................. 2003-298679

(51) Int. Cl.
*G01P 1/02* (2006.01)
(52) U.S. Cl. ..................... 73/493; 73/488; 73/514.39
(58) Field of Classification Search .................. 73/493, 73/494, 488, 496, 514.16, 514.39; 474/70, 474/102; 702/141, 142
See application file for complete search history.

(56) References Cited

U.S. PATENT DOCUMENTS

| | | | |
|---|---|---|---|
| 5,059,158 A * | 10/1991 | Bellio et al. .................... | 474/70 |
| 5,728,017 A | 3/1998 | Bellio et al. .................... | 474/70 |
| 5,992,553 A * | 11/1999 | Morrison ..................... | 180/206 |
| 6,159,130 A * | 12/2000 | Torvinen ........................ | 482/8 |
| 6,229,454 B1 * | 5/2001 | Heikkila et al. ........ | 340/870.14 |
| 6,356,848 B1 * | 3/2002 | Cote et al. .................... | 702/44 |
| 6,402,417 B1 * | 6/2002 | Okamoto .................. | 403/322.1 |
| 6,530,864 B1 * | 3/2003 | Parks ............................. | 482/4 |
| 6,899,649 B1 * | 5/2005 | Ichida et al. .................. | 474/70 |
| 2003/0100392 A1 * | 5/2003 | Ichida ......................... | 474/69 |

FOREIGN PATENT DOCUMENTS
EP      0887251      12/1998

OTHER PUBLICATIONS

An owner's manual available from Cateye Co., Ltd. (Cat Eye Astrale 8 Cyclocomputer CC-CD200, Owner's Manual), 2002.

* cited by examiner

*Primary Examiner*—Hezron Williams
(74) *Attorney, Agent, or Firm*—Olson & Hierl, Ltd.

(57) ABSTRACT

A measurement apparatus includes a speed sensor, a cadence sensor and a display portion. The apparatus further includes a transmit portion for wirelessly transmitting signals detected by the speed sensor and the cadence sensor to the display portion. The transmit portion is provided with a shaft portion extending in one direction, which rotatably supports the cadence sensor and the speed sensor. A measurement body portion including the speed sensor, the cadence sensor and the transmit portion is mounted on chain stay. The display portion is mounted on a portion of a handle in the field of vision of a rider of the bicycle, and it has functions of receiving and processing signals transmitted from the transmit portion, and displaying prescribed information. Thus, the measurement apparatus that can easily be mounted to a bicycle and the sensor apparatus applied thereto are obtained.

9 Claims, 6 Drawing Sheets

MEASUREMENT APPARATUS AND SENSOR APPARATUS

BACKGROUND OF THE INVENTION

1. Field of the Invention

The present invention relates to a measurement apparatus and a sensor apparatus, and particularly, to a measurement apparatus for measuring the cadence at which the pedals of a bicycle are worked and the running speed of the bicycle and displaying them, and to a sensor apparatus used therefor.

2. Description of the Background Art

Conventionally, a measurement apparatus including a cadence sensor and a speed sensor is attached to a bicycle for measuring the cadence at which the pedals of the bicycle are worked and the running speed of the bicycle. A reference (an owner's manual available from CatEye Co., Ltd. (CAT EYE ASTRALE 8 CYCLOCOMPUTER CC-CD200, Owner's Manual), 2002) describes handling of such a measurement apparatus.

In the conventional measurement apparatus described in the reference, as shown in FIG. 7, in order to measure the running speed of a bicycle 102, a wheel magnet 125 is attached at a prescribed position on a spoke 103a of a front wheel 103, and a speed sensor 120 sensing the magnetism of wheel magnet 125 is mounted at a prescribed position on a front fork 104 rotatably supporting front wheel 103.

Further, in order to measure the cadence at which the pedals 106 of bicycle 102 are worked (the number of rotation of the pedals), a cadence magnet 126 is attached at a prescribed position on a gear crank 107, and a cadence sensor 121 sensing the magnetism of cadence magnet 126 is mounted at a prescribed position on a chain stay 108 rotatably supporting each of the axes of gear crank 107 and a rear wheel 105.

Signals sensed by speed sensor 120 and cadence sensor 121 are transmitted for processing to a display portion 122 attached to a handle 109 through cables 123 and 124, and displayed as the speed of the bicycle and the number of rotation of the pedals, respectively.

Cable 123 connecting display portion 122 and speed sensor 120 is arranged along front fork 104, and cable 124 connecting display portion 122 and cadence sensor 121 is arranged along a downtube 110. The conventional measurement apparatus is configured as described above.

On the other hand, the conventional measurement apparatus has the following problem. Speed sensor 120 and cadence sensor 121 are electrically connected to display portion 122 through cables 123 and 124, respectively. Accordingly, making the length of cables 123 and 124 as short as possible so as to avoid their complicated arrangement, naturally speed sensor 120 will be arranged on front wheel 103 side. As for cadence sensor 121, as it is necessary to be arranged in the vicinity of gear crank 107, there is a limit on reducing the length of cable 124.

Accordingly, in the conventional measurement apparatus, speed sensor 120 is arranged on front wheel 103 side away from cadence sensor 121. Thus, speed sensor 120 and cadence sensor 121 must be individually mounted to respective prescribed positions and adjusted, and therefore the measuring apparatus is troublesome to be mounted.

SUMMARY OF THE INVENTION

The present invention is made to solve the problem described above, and one object thereof is to provide a measurement apparatus that can easily be mounted on a bicycle, and another object thereof is to provide a sensor apparatus that is applied to such a measurement apparatus.

A measurement apparatus according to the present invention includes: a measurement body portion arranged at a portion where a rear wheel of a bicycle and a gear crank are positioned; and a display portion arranged at a position in the field of vision of a rider of the bicycle for displaying prescribed information based on a signal transmitted from the measurement body portion. The measurement body portion includes a first sensor portion, a second sensor portion and a transmit portion. The first sensor portion senses movement of a prescribed part of the gear crank and detects a cadence at which a pedal is worked. The second sensor portion senses movement of a prescribed part of the rear wheel and detects a running speed of the bicycle. The transmit portion is electrically connected to the first sensor portion and the second sensor portion for wirelessly transmitting signals indicative of the movement sensed by the first sensor portion and the second sensor portion to the display portion.

With such a configuration, as the measurement body portion includes the transmit portion and signals indicative of the movement sensed by the first sensor portion and the second sensor portion are wirelessly transmitted to the display portion, it is not necessary to arrange cables and mounting procedure on the bicycle is facilitated.

Desirably, the measurement body portion is arranged between the rear wheel of the bicycle and the gear crank in a region in which the rear wheel and the rotating gear crank can be in a positional relationship facing to each other.

Thus, adjustment of the space between the first sensor portion and a prescribed part of the gear crank and adjustment of the space between the second sensor portion and a prescribed part of the rear wheel can be performed in the positions close to each other, and therefore the adjustment procedure can efficiently be performed.

Desirably, the first sensor portion is arranged toward the gear crank, and the second sensor portion is arranged toward the rear wheel. Additionally, desirably the first sensor portion and the second sensor portion are arranged displaced relative to each other in a front-rear direction of the bicycle.

Thus, the first sensor portion can be prevented from being affected by a prescribed part that actually should be sensed by the second sensor portion, and the second sensor portion can be prevented from being affected by a prescribed part that actually should be sensed by the first sensor portion.

Desirably, as a specific position of the arrangement between the rear wheel and the gear crank, the measurement body portion is secured to a chain stay connecting an axis of rotation of the rear wheel and a shaft of the gear crank.

In order for the measurement body portion to be secured to such a chain stay, the measurement body portion includes an abut portion provided to the transmit portion so as to conform to a shape of an outer circumference of the chain stay, a through hole provided above the abut portion in the transmit portion, and a belt portion for being inserted into the through hole to be coiled around the chain stay while the abut portion abuts on an outer circumferential portion of the chain stay, so as to secure the measurement body portion.

In this manner, the abut portion of the transmit portion tightly contacts to the chain stay, and the transmit portion is secured by the belt portion. Thus, the measurement body portion is surely be secured to the chain stay.

In order for the measurement body portion to be arranged between the rear wheel and the gear crank so as to be secured to the chain stay, desirably the transmit portion includes a shaft portion extending in a front-rear direction of the bicycle, and the first sensor portion is rotatably supported by the shaft portion so that a distance to a prescribed part of the gear crank can be adjusted, and the second sensor portion is rotatably supported by the shaft portion so that a distance to a prescribed part of the rear wheel can be adjusted.

Thus, adjustment of the space between the first sensor portion and a prescribed part of the gear crank and adjustment of the space between the second sensor portion and a prescribed part of the rear wheel can be performed at one place.

A sensor apparatus according to the present invention is for detecting a cadence at which a pedal of a bicycle is worked and a running speed of the bicycle, and it includes a transmit portion and first and second sensor portions. The transmit portion has a shaft portion extending in one direction and wirelessly transmits a prescribed signal. The first sensor portion is rotatably supported by the shaft portion and detects movement of a prescribed part of a gear crank and transmits a signal indicative of the detected movement to the transmit portion electrically connected to the first sensor portion. The second sensor portion is rotatably supported by the shaft portion for detecting movement of a rear wheel and transmits a signal indicative of the detected movement to the transmit portion electrically connected to the second sensor portion.

With such a configuration, as signals indicative of the movement sensed by the first and second sensor portions are wirelessly transmitted by the transmit portion, it is not necessary to arrange cables and mounting procedure on the bicycle is facilitated. Additionally, as each of the first and second sensor portions is rotatably supported by the shaft portion, adjustment of the space between the first sensor portion and a prescribed part and adjustment of the space between the second sensor portion and a prescribed part can be performed at one place. Therefore, the adjustment procedure can efficiently be performed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
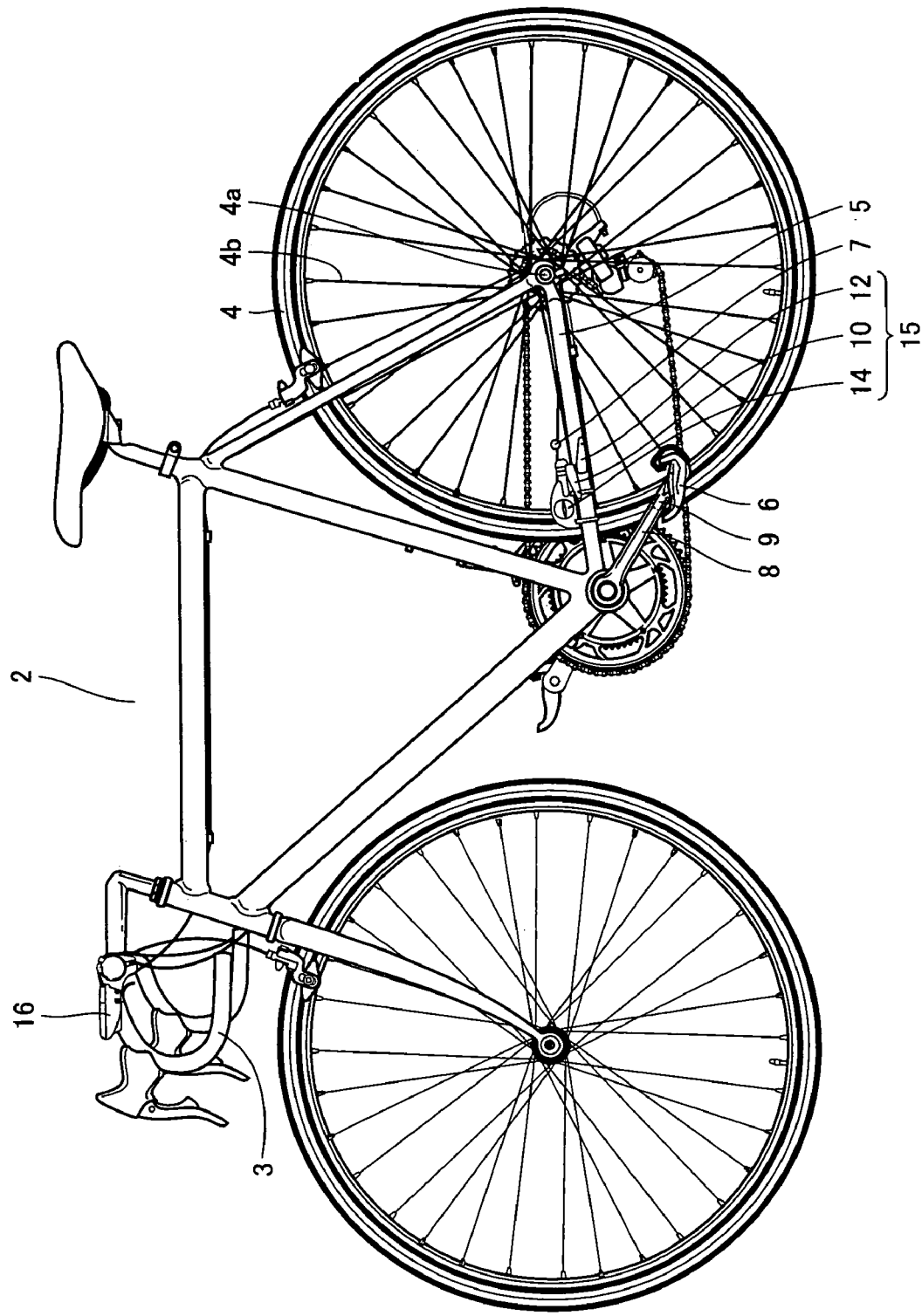
FIG. 1 is a side view showing a measurement apparatus mounted on a bicycle according to an embodiment of the present invention.

A measurement apparatus according to an embodiment of the present invention will be described. As shown in FIG. 1, the measurement apparatus includes a speed sensor 12, a cadence sensor 10 and a display portion 16. The apparatus further includes a transmit portion 14 for wirelessly transmitting signals detected by speed sensor 12 and cadence sensor 10 to display portion 16.

Figure 2:
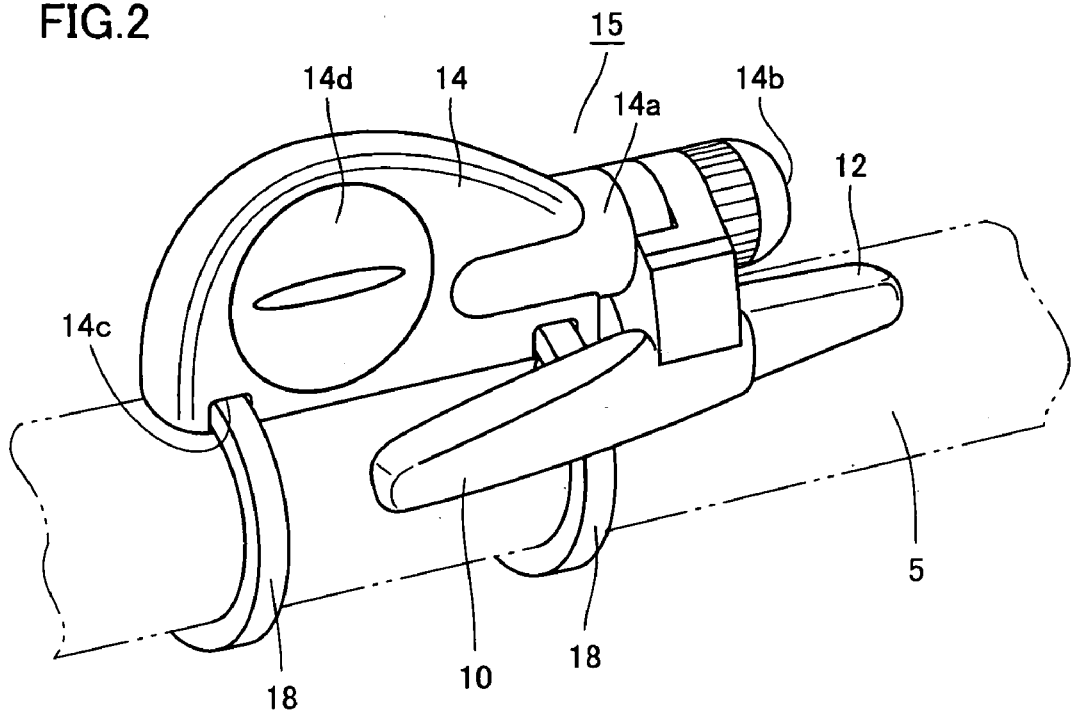
FIG. 2 is a perspective view showing a measurement body portion of the measurement apparatus shown in FIG. 1 seen from a pedal side according to the embodiment.
Figure 3:
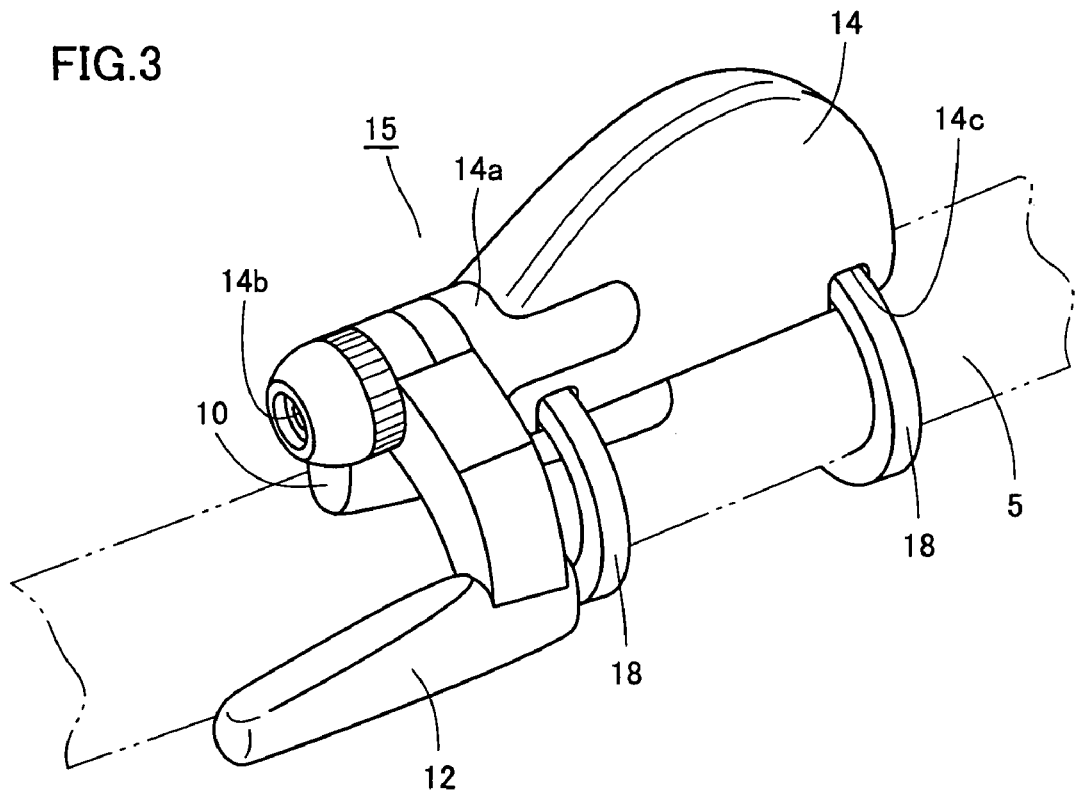
FIG. 3 is a perspective view showing the measurement body portion of the measurement apparatus shown in FIG. 1 seen from the rear wheel spoke side according to the embodiment.

As shown in FIGS. 2 and 3, transmit portion 14 is provided with a shaft portion 14a extending in one direction. Shaft portion 14a rotatably supports cadence sensor 10 and speed sensor 12. Cadence sensor 10 and speed sensor 12 are arranged displaced relative to each other in the front-rear direction of a bicycle 2. Transmit portion 14 is provided with a lid 14d for replacing a lithium battery, for example.

Figure 4:
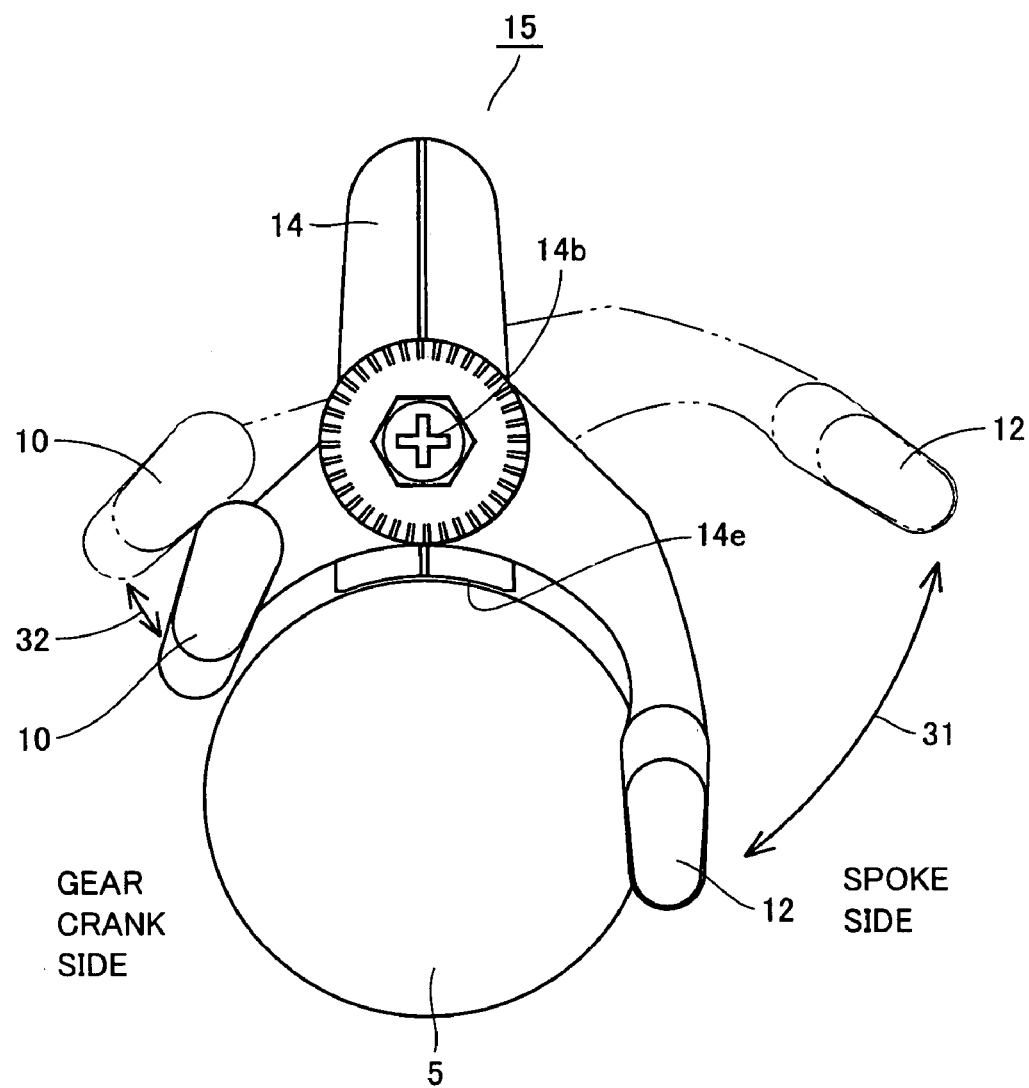
FIG. 4 is a plan view showing the measurement body portion of the measurement apparatus shown in FIG. 1 seen from the rear side according to the embodiment.

As shown in FIG. 4, cadence sensor 10 is arranged toward the gear crank side, while speed sensor 12 is arranged toward the rear wheel spoke side. At a portion of transmit portion 14 contacting to a chain stay 5, an abut portion 14e conforming to the outer circumference of chain stay 5 is formed.

A measurement body portion 15 including speed sensor 12, cadence sensor 10 and transmit portion 14 is mounted on chain stay 5 by a belt 18. A display portion 16 is mounted on a portion of a handle 3 in the field of vision of a rider of the bicycle. Display portion 16 has functions of receiving and processing signals transmitted from transmit portion 14, and displaying prescribed information.

Next, a procedure for mounting the measurement apparatus having measurement body portion 15 described above on bicycle 2 is described. First, a position on chain stay 5 at which measurement body portion 15 is mounted is determined. Specifically, as will be described later, the position is determined such that cadence sensor 10 overlaps two dimensionally with a circular trajectory of a cadence magnet 9 attached to a gear crank 8, and speed sensor 12 overlaps two dimensionally with a circular trajectory of a wheel magnet 7 attached to a spoke 4b of a rear wheel 4, as seen from a side of bicycle 2.

When the position at which measurement body portion 15 is mounted is determined, as shown in FIGS. 1–3, at that position measurement body portion 15 is secured on chain stay 5 by inserting belt 18 into a through hole 14c provided at transmit portion 14 and coiling belt 18 around chain stay 5.

Next, as shown in FIG. 4, with respect to measurement body portion 15 secured on chain stay 5, by turning cadence sensor 10 around shaft portion 14a as indicated by an arrow 32, the space between cadence magnet 9 (see FIG. 1) and cadence sensor 10 is adjusted to a distance optimum for cadence sensor 10 to sense the magnetism of cadence magnet 9.

Further, by turning speed sensor 12 around shaft portion 14a as indicated by an arrow 31, the space between wheel magnet 7 (see FIG. 1) and speed sensor 12 is adjusted to a distance optimum for speed sensor 12 to sense the magnetism of wheel magnet 7. When adjustment of each of the spaces is completed, by tightening an angle adjustment screw 14b provided to transmit portion 14, cadence sensor 10 and speed sensor 12 are fixed to shaft portion 14a.

Display portion 16 is mounted on a prescribed position on handle 3 with an appropriate mounting member (not shown). Thus, mounting of the measurement apparatus including measurement body portion 15 and display portion 16 on bicycle 2 is completed.

Figure 5:
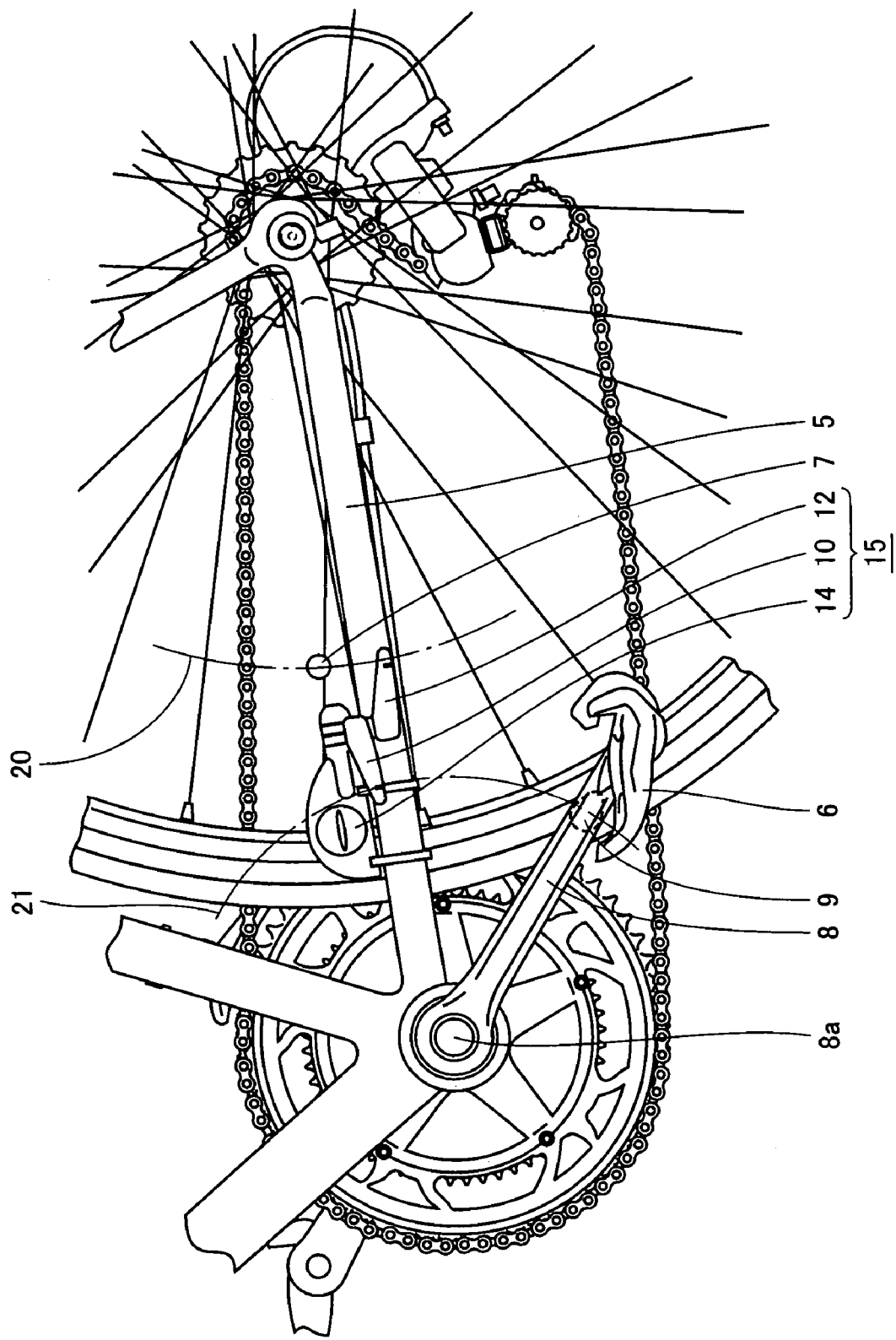
FIG. 5 is a partial enlarged side view showing the measurement body portion of the measurement apparatus shown in FIG. 1 and a peripheral portion of the measurement body portion according to the embodiment.

Next, an operation of the measurement apparatus will be described. When a rider works pedals 6, the driving force is transferred to rear wheel 4 and the bicycle starts to run. As shown in FIG. 5, when a rider works pedals 6, cadence magnet 9 attached to gear crank 8 draws circular trajectory 21 indicated by an alternate long and short dash line. Wheel magnet 7 attached to spoke 4b of rear wheel 4 draws circular trajectory 20 indicated by an alternate long and short dash line.

Cadence sensor 10 is arranged so as to overlap two dimensionally with circular trajectory 21 as seen from a side of bicycle 2. When cadence magnet 9 comes close to cadence sensor 10, the magnetism of cadence magnet 9 is sensed by cadence sensor 10.

Speed sensor 12 is arranged so as to overlap two dimensionally with circular trajectory 20 as seen from a side of bicycle 2. When wheel magnet 7 comes close to speed sensor 12, the magnetism of wheel magnet 7 is sensed by speed sensor 12.

When the magnetism of cadence magnet 9 and that of wheel magnet 7 are sensed by cadence sensor 10 and speed sensor 12, respectively, signals thereof are wirelessly transmitted from transmit portion 14 to display portion 16.

Figure 6:
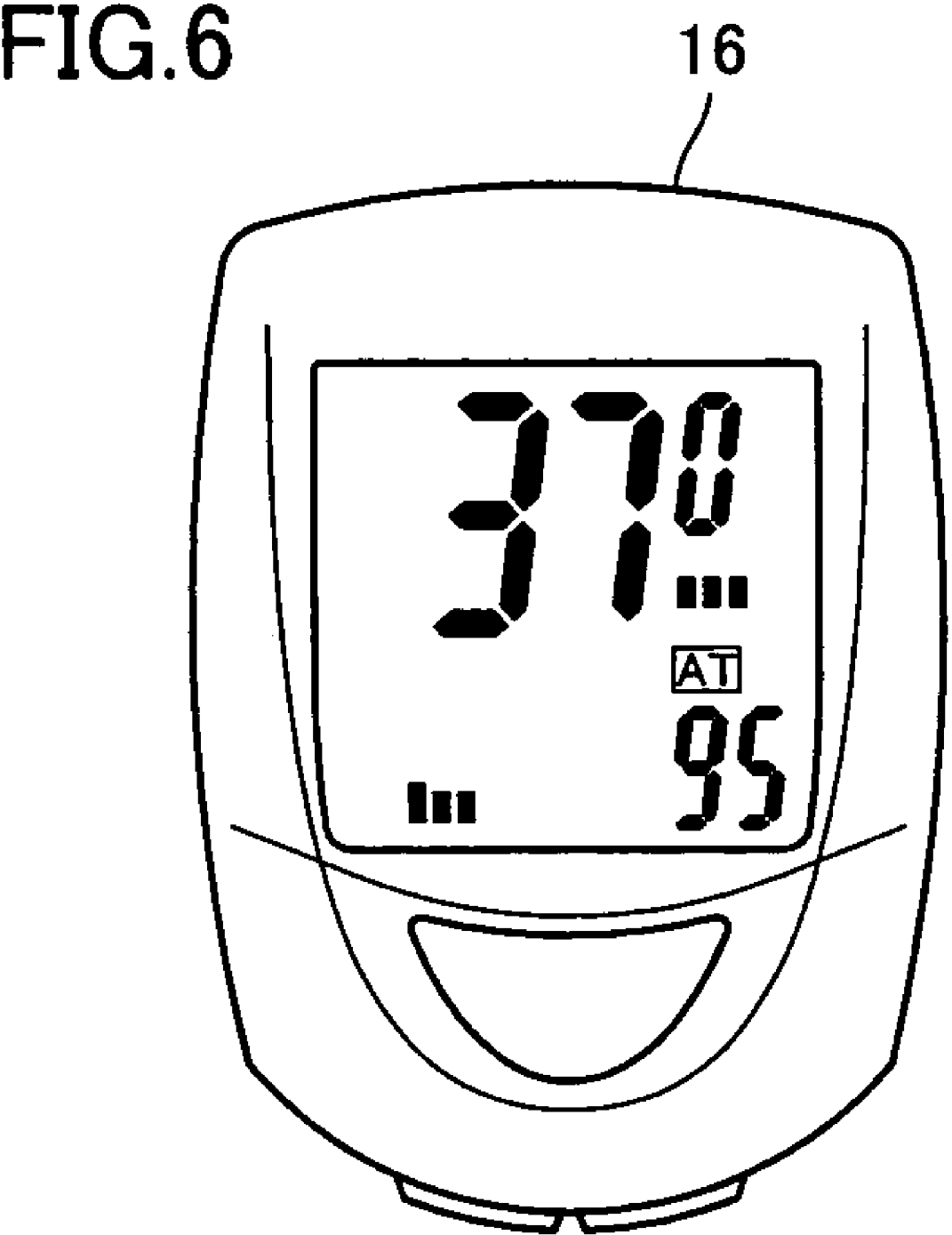
FIG. 6 is a plan view showing a display portion of the measurement apparatus shown in FIG. 1 according to the embodiment.
Figure 7:
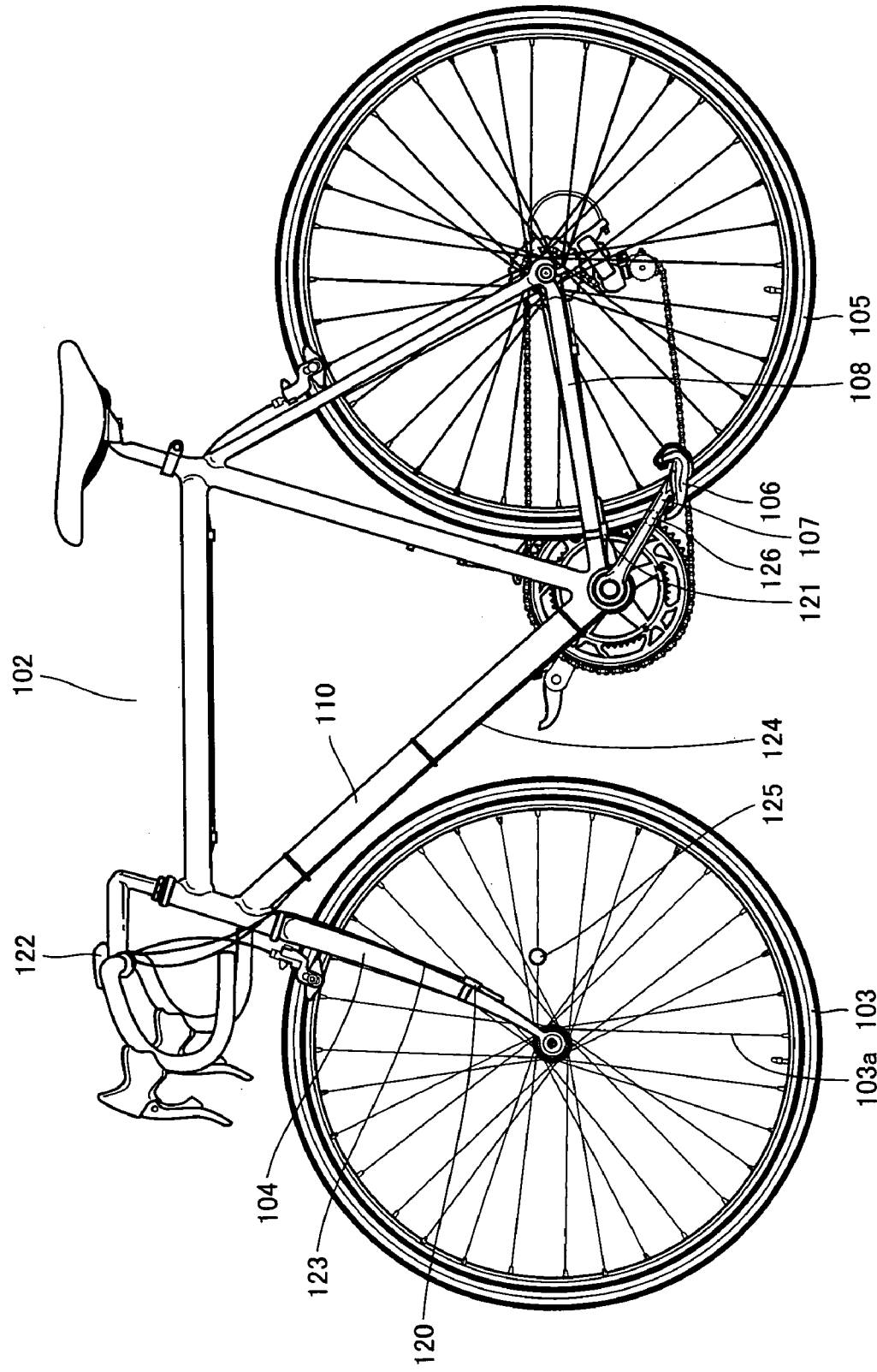
FIG. 7 is a side view showing a conventional measurement apparatus mounted on a bicycle.

In display portion 16, with accommodated arithmetic circuitry or the like, the cadence at which pedals 6 are worked (the number of rotation of the pedals) is calculated based on time intervals detecting the magnetism of cadence magnet 9. Additionally, the running speed of the bicycle is calculated based on the time intervals sensing the magnetism of wheel magnet 7 and the circumference of rear wheel 4. Information related to the calculated number of rotation of pedals 6 and running speed of bicycle 2 is shown on a prescribed display of display portion 16, as shown in FIG. 6.

With the measurement apparatus described above, comparing with a conventional measurement apparatus, as measurement body portion 15 includes transmit portion 14 and signals sensed by speed sensor 12 and cadence sensor 10 are wirelessly transmitted to display portion 16, it is not necessary to arrange cables and mounting procedure on bicycle 2 is facilitated.

Further, as shaft portion 14a supported by transmit portion 14 of measurement body portion 15 rotatably supports cadence sensor 10 and speed sensor 12, comparing with a conventional measurement apparatus in which a speed sensor and a cadence sensor are mounted away from each other, adjustment of the space between cadence sensor 10 and cadence magnet 9 and adjustment of the space between speed sensor 12 and wheel magnet 7 can be achieved at one place. Thus, the adjustment procedure can efficiently be performed.

Still further, as signals detected by cadence sensor 10 and speed sensor 12 can be transmitted from one transmit portion 14, comparing with a case where a transmit portion is provided to each of sensors, magnet replacement is required only at one place and therefore easier maintenance is achieved.

Still further, by arranging cadence sensor 10 and speed sensor 12 displaced relative to each other in the front-rear direction of a bicycle 2, arranging cadence sensor 10 toward gear crank 8 side, and arranging speed sensor 12 toward rear wheel 4 side, cadence sensor 10 can be prevented from being affected by wheel magnet 7, and speed sensor 12 can be prevented from being affected by cadence magnet 9.

In the measurement apparatus described above, an exemplary case has been described in which measurement body portion 15 is mounted at a prescribed position on chain stay 5. The mounting position is not limited to such a position, and measurement body portion 15 can be mounted at a position in the vicinity of rear wheel 4 and gear crank 8, i.e., in the vicinity of rear wheel 4 and gear crank 8 to an extent the magnetism of cadence magnet 9 attached to gear crank 8 and that of wheel magnet 7 attached to rear wheel 4 can be sensed by cadence sensor 10 and speed sensor 12 each rotatably supported by transmit portion 14.

In special, to take advantage of achieving space adjustment between cadence sensor 10 and cadence magnet 9 and space adjustment between speed sensor 12 and wheel magnet 7 at one place, it is preferable to mount measurement body portion 15 between rear wheel 4 and gear crank 8 in a region where gear crank 8 and rear wheel 4 can be in a positional relationship facing to each other.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A measurement apparatus, comprising: a measurement body portion arranged at a portion where a rear wheel of a bicycle and a gear crank are positioned; and a display portion arranged at a position in a field of vision of a rider of the bicycle for displaying prescribed information based on a signal transmitted from said measurement body portion, wherein said measurement body portion including
    a first sensor portion for sensing movement of a prescribed part of the gear crank to detect a cadence at which a pedal is worked,
    a second sensor portion for sensing movement of a prescribed part of the rear wheel to detect a running speed of the bicycle, and
    a transmit portion electrically connected to said first sensor portion and said second sensor portion for wirelessly transmitting signals indicative of the movement sensed by said first sensor portion and said second sensor portion to said display portion said transmit portion including a shaft portion extending in one direction and rotatably supporting each of said first and second sensor portions, the distance between said first sensor portion and a prescribed part of the gear crank being adjusted by rotating said first sensor portion around said shaft portion, and the distance between said second sensor portion and a prescribed part of the rear wheel being adjusted by rotating said second sensor around said shaft portion.

2. The measurement apparatus according to claim 1, wherein said measurement body portion is arranged between the rear wheel of the bicycle and the gear crank in a region in which the rear wheel and the rotating gear crank can be in a positional relationship facing to each other.

3. The measurement apparatus according to claim 1, wherein said first sensor portion is arranged toward the gear crank, and said second sensor portion is arranged toward the rear wheel.

4. The measurement apparatus according to claim 1, wherein said first sensor portion and said second sensor portion are arranged displaced relative to each other in a front-rear direction of the bicycle.

5. The measurement apparatus according to claim 1, wherein said measurement body portion is secured to a chain stay connecting an axis of rotation of the rear wheel and a shaft of the gear crank.

6. The measurement apparatus according to claim 5, wherein said measurement body portion includes an abut portion provided to said transmit portion so as to conform to a shape of an outer circumference of the chain stay, a through hole provided above said abut portion in said transmit portion, and a belt portion for being inserted into said through hole to be coiled around the chain stay while said abut portion abuts on an outer circumferential portion of the chain stay, so as to secure said measurement body portion.

7. A sensor apparatus having a first sensor portion for detecting a cadence at which a pedal of a bicycle is worked and a second sensor portion for detecting a running speed of the bicycle, comprising:

a transmit portion, having a shaft portion extending in one direction and rotatably supporting each of said first and second sensor portions for wirelessly transmitting a prescribed signal;

said first sensor portion detecting movement of a prescribed part of a gear crank to transmit a signal indicative of the detected movement to said transmit portion electrically connected to the first sensor portion; and said second sensor portion detecting movement of a rear wheel to transmit a signal indicative of the detected movement to said transmit portion electrically connected to the second sensor portion.

8. A sensor apparatus having a first sensor means for detecting a cadence at which a pedal of a bicycle is worked and a second sensor means for detecting a running speed of the bicycle, said bicycle including a gear crank and a rear wheel, said sensor apparatus comprising:

transmit means, having a shaft portion extending in one direction and rotatably supporting each of said first and second sensor means for wirelessly transmitting a prescribed signal;

said first sensor means detecting movement of a prescribed part of the gear crank to transmit a signal indicative of the detected movement to said transmit means electrically connected to the first sensor means; and said second sensor means detecting movement of a rear wheel to transmit a signal indicative of the detected movement to said transmit means electrically connected to the second sensor means.

9. A measurement apparatus, comprising: a measurement body portion arranged at a portion where a rear wheel of a bicycle and a gear crank are positioned; and a display portion arranged at a position in a field of vision of a rider of the bicycle for displaying prescribed information based on a signal transmitted from said measurement body portion, said measurement body portion including a first sensor portion for sensing movement of a prescribed part of the gear crank to detect a cadence at which a pedal is worked, a second sensor portion for sensing movement of a prescribed part of the rear wheel to detect a running speed of the bicycle, and a transmit portion electrically connected to said first sensor portion and said second sensor portion for wirelessly transmitting signals indicative of the movement sensed by said first sensor portion and said second sensor portion to said display portion, said measurement body portion being secured to a chain stay connecting an axis of rotation of the rear wheel and a shaft of the gear crank, said measurement body portion including an abut portion provided to said transmit portion so as to conform to a shape of an outer circumference of the chain stay, a through hole provided above said abut portion in said transmit portion, and a belt portion for being inserted into said through hole to be coiled around the chain stay while said abut portion abuts on an outer circumferential portion of the chain stay, so as to secure said measurement body portion.

* * * * *